United States Patent [19]

Cullingford

[11] Patent Number: 5,005,787
[45] Date of Patent: Apr. 9, 1991

[54] METHOD AND APPARATUS FOR BIO-REGENERATIVE LIFE SUPPORT SYSTEM

[75] Inventor: Hatice S. Cullingford, Houston, Tex.

[73] Assignee: The United States of America as represented by the Administrator of the National Aeronautics and Space Administration, Washington, D.C.

[21] Appl. No.: 378,548

[22] Filed: Jul. 11, 1989

[51] Int. Cl.$^5$ .............................................. B64G 1/46
[52] U.S. Cl. ................................... 244/163; 244/159;
47/1.4; 47/62; 55/75; 210/748
[58] Field of Search ............................ 244/159, 163;
47/59-64, 17, 1.4, 69, 58; 55/75, 389; 210/748,
806, 919

[56] References Cited

U.S. PATENT DOCUMENTS

| 3,355,860 | 12/1967 | Arnoldi | 55/75 |
| 3,749,332 | 7/1973 | Gray | 47/1.4 |
| 4,090,940 | 5/1978 | Switzgable | 210/748 |
| 4,403,446 | 9/1983 | Wolfe et al. | 47/58 |

OTHER PUBLICATIONS

William Hines, "Algae Rig May Supply Oxygen in Space Ships", Washington Star, Sep. 11, '58, pp. A-29.
R. F. Dempewolff, "Gardens to Feed our Spacemen", Jun. 1960, Popular Mechanics, p. 123.
Status of the Space Station Water Reclamation and Management Subsystem Design Concept, R. M. Bagdigian and P. L. Mortazavi, 17th Intersociety Conference on Environmental Systems, Seattle, Wash., Jul. 13-15, 1987.
The Space Station Air Revitalization Subsystem Design Concept, C. D. Ray, K. Y. Ogle, R. W. Tipps, R. L. Carrasquillo, and P. Wieland, 17th Intersociety Conference on Environmental Systems, Seattle, Wash., Jul. 13-15, 1987.
Status of the Space Station Environmental Control and Life Support Systems Design Concept, C. D. Ray and W. R. Humphries, Life Support & Environmental Branch, NASA Marshall Space Flight Center, Huntville, Ala., pp. 297-308.
Composition and Analysis of a Model Waste for a CELSS, T. Wydeven, Ames Research Center, Moffett Field, Calif., NASA Technical Memorandum 84368.
Optimization of Controlled Environmental for Hydroponic Production of Leaf Lettuce for Human Life Support in CELSS, Cary A. Mitchell, Sharon L. Knight, and Tameria L. Ford, Dept. of Horticulture, Purdue Univ., West Lafayette, Ind., 47907, pp. 499-521.

Primary Examiner—Galen Barefoot
Assistant Examiner—Christopher P. Ellis
Attorney, Agent, or Firm—Hardie R. Barr; Harold W. Adams; Edward K. Fein

[57] ABSTRACT

A life support system for human habitation (cabin) having a bio-regenerative capability through the use of a plant habitat (greenhouse) whereby oxygen-rich air from the greenhouse is processed and used in the cabin and carbon dioxide-rich air from the cabin is used in the greenhouse. Moisture from the air of both cabin and greenhouse is processed and reused in both. Wash water from the cabin is processed and reused in the cabin as hygiene water, and urine from the cabin is processed and used in the greenhouse. Spent water from the greenhouse is processed and reused in the greenhouse. Portions of the processing cycles are separated between cabin and greenhouse in order to reduce to a minimum cross contamination of the two habitat systems. Other portions of the processing cycles are common to both cabin and greenhouse. The use of bio-regenerative techniques permits a substantial reduction of the total consumables used by the life support system.

12 Claims, 4 Drawing Sheets

METHOD AND APPARATUS FOR BIO-REGENERATIVE LIFE SUPPORT SYSTEM

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

The invention relates to life support systems, and more particularly to life support systems wherein the system is augmented by regenerative interchange between human and plant life cycles to achieve an integrated operation with air, water, and waste processing and supplemental food production having maximized reliability, regenerative operation, reduced consumables and fresh harvest capability.

Manned missions to the planet Mars are included in the present NASA plans for the first decade of the next century (See S. K. Ride, "LEADERSHIP and America's Future in Space." Report to NASA Administrator, Aug. 1987). The first step of human exploration and eventual settlement on Mars will probably be series of fast missions ("sprints"), with a duration of just over one year, round trip (See "Piloted Sprint Missions to Mars." Science Applications International Corporation, Report No. SAIC-87/1908, Nov. 1987). Those missions will constitute a new problem for the life support system design, because no other mission has been flown, nor will be flown in the near future, with such a long duration of time during which no resupply of consumables is possible. Regenerative operations will have to be used extensively for the reduction of the amounts of food, water, hydrogen, and oxygen to be carried in storage aboard the spacecraft. The conceptual design of the life support for such a mission is given and analyzed, down to the level of the particular physical-chemical subsystems involved. Space Station-type hardware has been chosen when applicable as a basis for the analysis.

It has been assumed heretofore that for such sprint missions, an extensive use of bio-regenerative life support (encompassing air, water, and food/waste processing by plants) would not be adopted. However, the implications of having a greenhouse aboard the spacecraft have been considered and analyzed in terms of its interface with the overall life support system. Further implications, such as the need for microbiological control at the humans/plants interfaces, are presented in a paper on bio-isolation co-authored by the inventor (See M. Novara and H. S. Cullingford, "Bio-isolation Analysis of Plants and Humans in a Piloted Mars Sprint." 18th Intersociety Conference on Environmental Systems, July, 11-13, 1988).

Mission Scenario

The baseline scenario envisaged for a Mars sprint is a split mission concept. In this scenario, all cargo not required by the crew for the outbound leg of the mission is sent on a robotic vehicle using a low-energy trajectory to Mars. The cargo consist of the Mars lander, all deployable science packages, and the propellant for the return leg of the crew mission.

The piloted vehicle would then be launched on a sprint trajectory approximately 1 year later. The two vehicles would rendezvous in Mars orbit. Total permanence of the piloted vehicle in Mars orbit would be 30 days; during this time, 10 to 20 days would be spent by a landing party on the Martian surface. It is expected that the total mission of the piloted vehicle is slightly longer than 1 year (420 days, or 14 months). The outbound leg is 224 days, the return leg 166 days. A free-return abort for the piloted vehicle is foreseen if rendezvous with the cargo vehicle is impossible; the abort would be accomplished by a shallow pass through the Mars atmosphere, sufficient to deflect the piloted vehicle's trajectory, but not to capture it into Mars orbit. It is anticipated that an excess of solar energy will be available during most of the outbound leg. In Mars orbit, as well as during the return leg, available solar energy will be relatively limited.

A possible configuration for the piloted vehicle is based on the requirements of supporting a crew of six using chemical propulsion (LO2/LH2) and aerobraking in Mars atmosphere, no artificial gravity, and Space Station-type technology (e.g., pressurized modules).

The mission abort option in the case of a failed rendezvous implies that the life support consumables needed for the return leg will be stored aboard the piloted vehicle itself, and not on the cargo vehicle.

Life Support Requirements and Constraints

The top-level requirements imposed by the mission onto the life support system are the following.

Continued operations for 14 months with no resupply from Earth

Regenerative operations for reduced amount of stored consumables

Synergystic mode of operations between the spacecraft systems

Support for a crew of six with the current technology base

Earth-like conditions of the living environment:
  Air and water quality
  Availability of fresh food Maximized safety and reliability The mission scenario dictates the requirement that no resupply of any consumable is possible for the total mission duration of 14 months.

There is a need to minimize the launch mass, i.e., the number of launch vehicles needed to place all spacecraft components in the Space Station orbit, where they are to be assembled. A mass reduction can be achieved by extensive regenerative operations for various consumables used in the life support.

Viable options for a synergystic mode of operation between different spacecraft systems are highly desirable in terms of mass and complexity reduction. Because the details are not available now, this requirement can only be met in a limited way. However, one major benefit in this regard is the use of LO2/LH2 for propulsion; stored amounts of these propulsive consumables will be shared with the life support system.

A crew of six is suggested for this mission (the design can, of course, be scaled for a different crew size). The life support design loads are basically the same as those used for the Space Station, with some exceptions mentioned subsequently.

The long time period during which the crew will be exposed to the use of regenerated and recycled consumables such as air and water dictates that a very strict control upon the level of contaminants be implemented.

Water or air qualities required for previous space missions of shorter duration might possibly cause adverse effects on the crew health in the long term. This is reflected in the requirement of providing an "Earth-like" living environment. In addition, the crew is expected to benefit psychologically from being able to grow some fresh food.

Maximized safety and reliability are obvious requirements; most functions of the life support have to be accomplished by some diversity of configurations and modes of operation of the system. Several functions (e.g., CO2 removal and reduction) are performed in different ways at the same time; one option (physical-chemical) is able to take over the load usually handled by the other (biological), thus the human life support system would continue to function even if all plant life were lost.

SUMMARY OF THE INVENTION

The invention is an integrated life support system to provide air, water, and waste/resource processing and food production in space missions of long duration including lunar or planetary surface missions. This is necessary for the next generation of space projects such as advanced space station, lunar or Mars bases, and planetary spacecraft. The invention relies on minimum resupply and possible waste and local resource processing for increased self sufficiency.

The invention includes "processors" for air, water, waste, crop/food and materials, "greenhouse" for crop plants including higher plants and algae, and "supporting equipment" for storage, material/process transport, instrumentation, controls, and system integration. The mode of operation includes regenerative and integrated operations with air, water, and food starting with an initial optimized, minimum resupply and supplementation for makeup from interface with other systems, local supply or waste recycling. Long duration of months or years make it imperative that some waste processing, recycling be practiced. The humans provide the raw materials for the processors in their breathing air, used water, metabolic wastes, garbage, and local materials (i.e. lunar material, martian atmosphere).

DESCRIPTION OF THE PREFERRED EMBODIMENT

Figure 1:
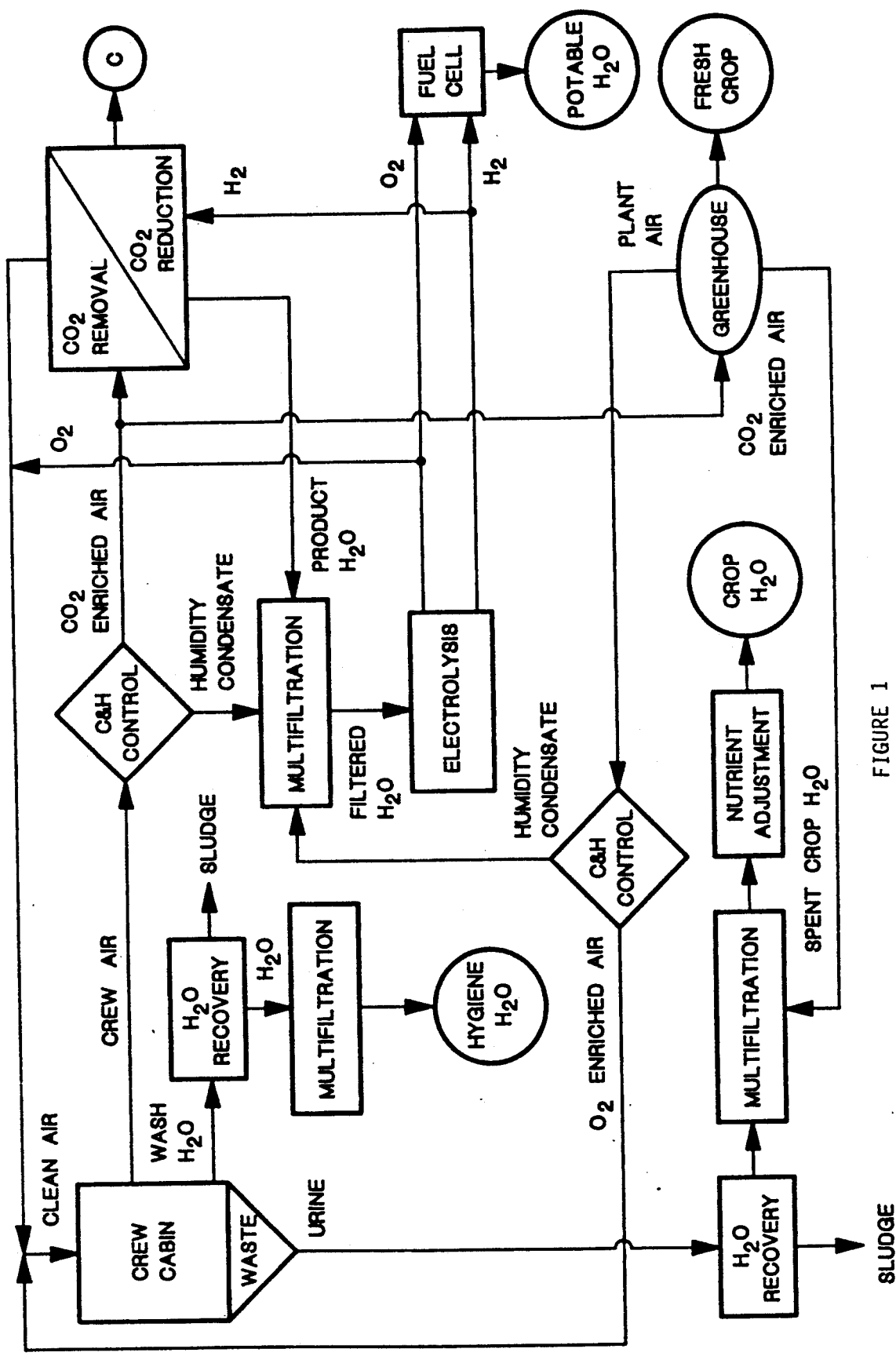
FIG. 1 is a block diagram for a life support system incorporating the present invention.
Figure 2:
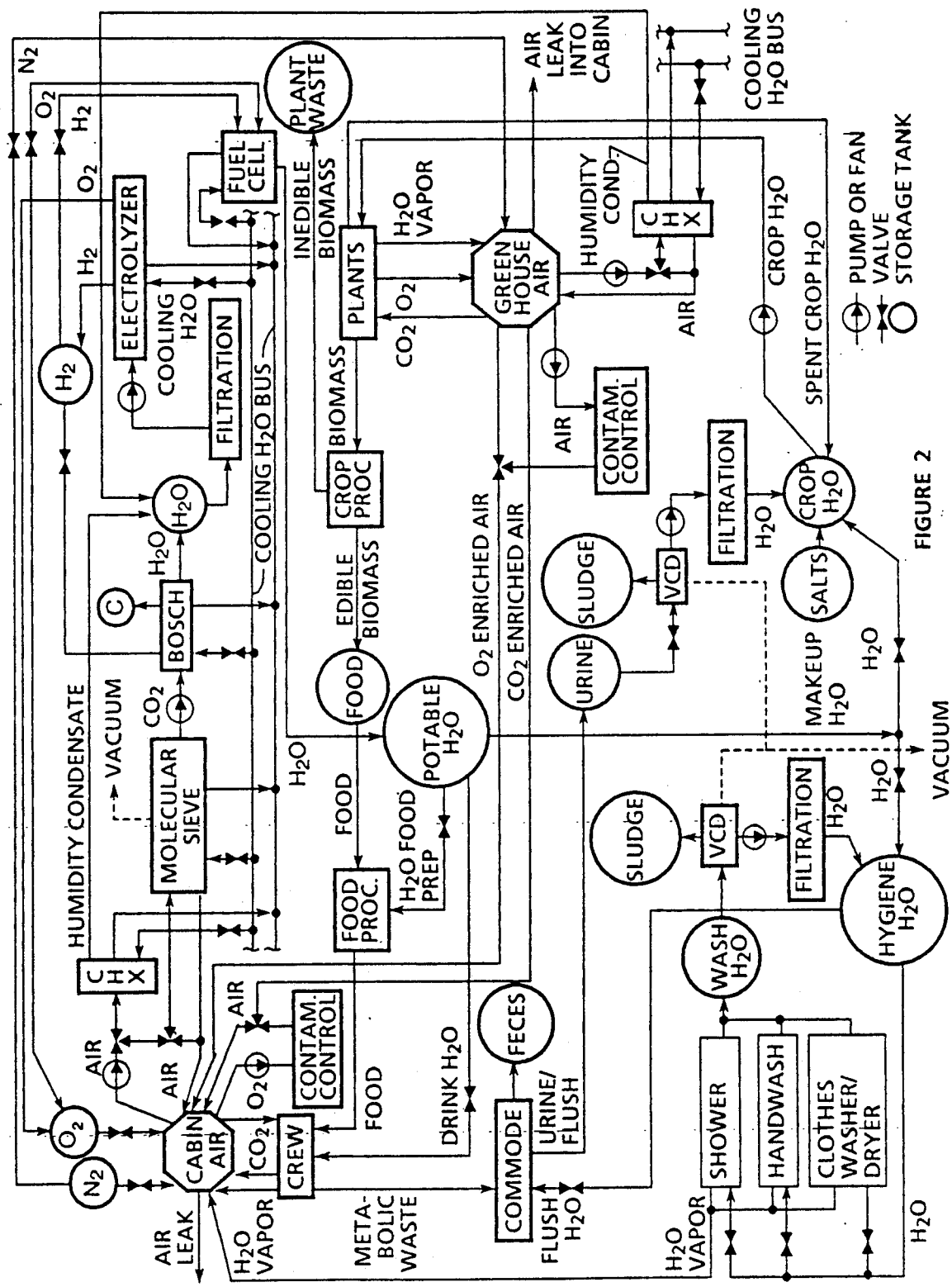
FIG. 2 is a flow chart of a life support system according to the present invention.

An overview of the life support system functions is given in the block diagram of FIG. 1. FIG. 2 shows the life support system flow chart with boxes indicating processors. In this sense, humans and plants are considered as processors. Items shown as circles are reservoirs of consumables; the content of any reservoir can vary during a mission. The cabin air and the greenhouse air are different from a tank in that their mass and energy content is kept nearly constant in time; they are rather to be regarded as system control points.

Referring to FIG. 1, operation of the system will now be described. The air in the human habitat (crew cabin) is continuously controlled in pressure, temperature, humidity, chemical composition, and level of contaminants by a contaminant and humidity control subsystem. The contaminant and humidity (C and H) control subsystem separates humidity condensate for cleaning at a multifiltration subsystem. The filtered water from the multifiltration subsystem is sent to the electrolyzer subsystem for decomposition as oxygen and hydrogen. The oxygen output is sent to the oxygen reservoir of the power and propulsion system to be used as needed for oxygen makeup or for water production at the fuel cell system. The hydrogen output is sent to the hydrogen reservoir of the power and propulsion system and can be used for water production at the fuel cell system as needed or for hydrogen input to CO2 processors as discussed later. The fuel cell system produces pure water for drinking (i.e., potable water).

The drier air coming from the (C and H) control subsystem is fed into the CO2 removal subsystem for removal of CO2 and is returned to the crew cabin. The CO2 removed is reduced to carbon with hydrogen to obtain product water (which is fed into multifiltration system for use in the electrolyzer). The carbon can be used in odor control of human waste.

Wash water from the crew cabin is processed in a water recovery subsystem, and then in a multifiltration subsystem to produce hygiene water for human use.

Urine from the crew cabin is similarly processed by a water recovery subsystem followed by multifiltration to produce crop water for the plants after appropriate nutrient adjustments. Spent nutrient solution from the greenhouse is cleaned by multifiltration, again adjusted for nutrients and reused for crop water.

The greenhouse receives the CO2 enriched air which has been processed for contaminants removal by the C&H control system. The oxygen enriched air from the greenhouse is also processed in a C and H control subsystem for contaminants removal and is returned to the crew cabin, while the humidity condensate is multifiltered and available for electrolysis along with the humidity condensate from the crew cabin. Fresh plants from the greenhouse are sent to crop and food processors to obtain food for the crew.

Air Processing

The crew cabin air is controlled in pressure, temperature, humidity, chemical composition, and level of contaminants. The main requirements for cabin air are shown in Table 1. These are basically the Space Station requirements; however, a more stringent requirement of the quality of air has been imposed in terms of maximum CO2 concentration: 0.2 percent is about half of the maximum allowed for the Space Station and more than six times the normal terrestrial level. The crew living in this environment consume food, potable water, and oxygen from air and produce carbon dioxide, water vapor, and metabolic waste (urine and feces).

A greenhouse is included in the system; its main features are listed below.

The greenhouse is physically separate from the crew cabin, although it is enclosed in the latter.

Pressure, temperature, humidity, contaminant, and composition control of the greenhouse air is performed independently from the cabin air to meet the requirements shown in Table 1.

A mixed crop of lettuce and winged beans is grown in the greenhouse in order to provide supplementary fresh food to the crew. The edible harvest corresponds to 22 percent of the daily need on a wet mass basis. (Lettuce and winged beans were chosen only for analysis, other crop plants and algae could be used with corresponding variation in their percent contributions.)

The plants grown in the greenhouse can be regarded as processors, receiving an input of carbon dioxide and water with nutrients (i.e., crop water), and producing an output of oxygen, water vapor, and biomass (partly edible, the remainder inedible).

The control of the cabin air chemical composition is primarily accomplished by the following actions:
Removal of $CO_2$ by a molecular sieve subsystem
Addition of $O_2$ and $N_2$ from storage reservoir for makeup.

Figure 3:
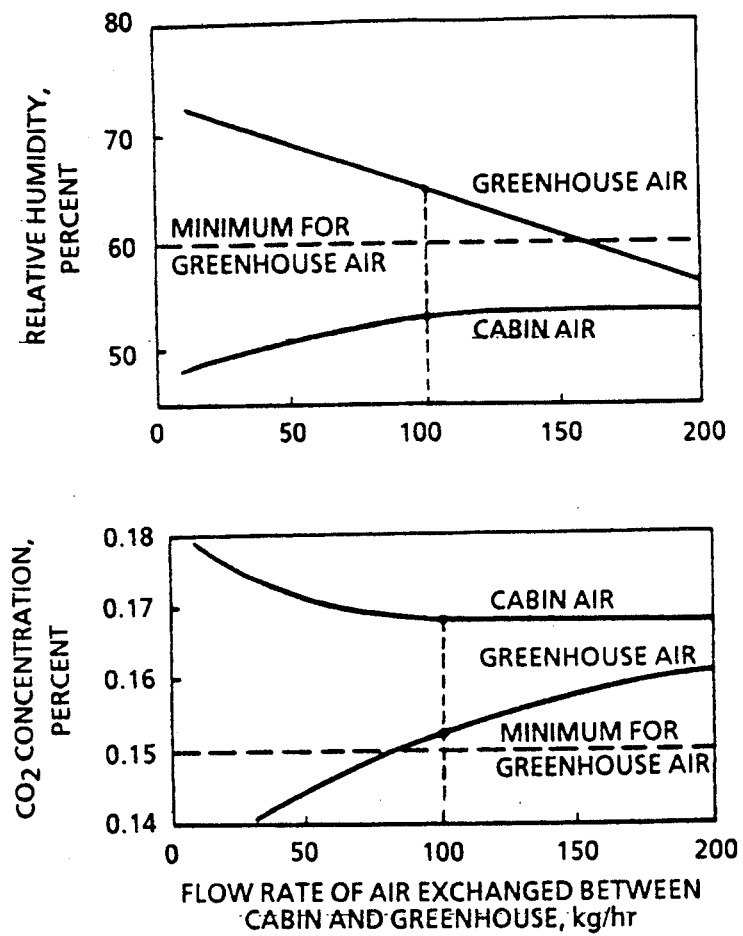
FIG. 3 shows the concentration of carbon dioxide and relative humidity versus flow rate of air exchanged between cabin and greenhouse.

A small flow rate of air is exchanged between cabin and greenhouse for the dual purpose of composition control of the greenhouse atmosphere ($CO_2$ addition, $O_2$ removal) and supplemental cabin air revitalization (9 percent of the crew $CO_2$ production is treated by the plants). Note that this mode of operation is based on a mass transfer of $CO_2$ from cabin to greenhouse; this implies that the $CO_2$ concentration shall be higher in the crew cabin than in the greenhouse. Since it is required (Table 1) that cabin $CO_2$ is as low as possible, and greenhouse $CO_2$ at least 0.15 percent for a faster plant growth, the difference in concentration between the two environments has to be minimized. This can be accomplished by increasing the flow rate of air exchanged; however, this would negatively affect the possibility of maintaining the relative humidity low in the cabin and high in the greenhouse. FIG. 3 shows these effects. A flow rate of 100 kg/hr is selected as nominal.

The $CO_2$ and accompanying water vapor is fed from the molecular sieve on a continuous basis into a Bosch reactor subsystem. The Bosch reduces the $CO_2$ to carbon powder and recovers the oxygen forming a liquid water product.

TABLE 1

| Cabin and Greenhouse Air Requirements | | |
|---|---|---|
| | Crew cabin | Greenhouse |
| Air temperature, K. | 294 + 1 +0 | 300 + 1 +2.76 |
| Air Pressure, kPa | 101.3–2.76 | 101.3–0 |
| Relative humidity, percent | 25–75 | 60–90 |
| Ventilation, m/s | 0.08–0.2 | 2–5 |
| $O_2$ concentration, percent | 19.2–22.8 | 19.2–22.8 |
| $CO_2$ concentration, percent | ≦0.2 | ≧0.15 |

The nominal flow rates of gases in the life support system are listed in Table 2. These are based on time-averaged loads from crew and plants.

TABLE 2

| Nominal Gas Flow Rates (in grams/day) | |
|---|---|
| Oxygen | |
| From plants | +524 |
| From electrolysis | +27 810 |
| From cryostorage | +1217 |
| Consumed by crew | −5065 |
| Lost in cabin air leak | −511 |
| Consumed by fuel cell | −24 035 |
| Hydrogen | |
| From electrolysis | +3484 |
| From cryostorage | +77 |
| Consumed by Bosch | −557 |
| Consumed by fuel cell | −3004 |
| Carbon Dioxide | |
| From crew | +6135 |

TABLE 2-continued

| Nominal Gas Flow Rates (in grams/day) | |
|---|---|
| Lost in cabin air leak | −6 |
| Consumed by plants | −563 |
| Reduced by Bosch | −5566 |
| Nitrogen | |
| From cryostorage | +1752 |
| Lost in cabin air leak | −1752 |

The combined temperature and humidity control of both the cabin and the greenhouse is performed by two condensing heat exchangers and air bypass valves. The air humidity (dewpoint temperature) is approximately set by the cooling water temperature at the heat exchanger inlet; this calls for chilled water into the cabin heat exchanger (277K) and warmer water into the greenhouse heat exchanger (292K).

The pressure control of both the greenhouse and cabin atmospheres is achieved by gas resupply (primarily $N_2$) to compensate for the overboard leakage.

Air contaminant control assemblies are present in both the cabin and the greenhouse; these will be comprised of the following series:
A microoiological control treatment (e.g., UV irradiation)
An HEPA filter for particulate control
A trace contaminant oxidizer (a thermal or catalytic burner, or ozonation treatment).

The air exchanged between cabin and greenhouse will be drawn downstream each contaminant control assembly in order to avoid transfer of pollutants and cross contamination between the two environments.

Water Processing

Two types of clean water are available for the crew as listed below. (R. M. Bagdigian and P. L. Mortazavi, "Status of the Space Station Water Reclamation and Management Subsystem Design Concept." 17th Intersociety Conference on Environmental Systems, SAE Paper 871510, July 13-15, 1987)
Potable water (for crew drink and food preparation; content of dissolved and suspended solids <0.01 percent)
Hygiene water (for crew hand, body and clothes wash; solids content <0.05 percent).

In order to reduce the amount of water to be maintained in the system (for microbiological control reasons), the daily requirement for hygiene water has been drastically reduced in comparison with that of the Space Station. This approach follows earlier design philosophies (e.g., Skylab). It is assumed here that
Each day only one crewmember will take a shower, 6 days per week.
No dishwasher is considered.
Clothes will be washed once per week, on a day when no shower water is used; a total weekly amount of clothes wash water is equal to the daily requirement of a Space Station crewmember.

Figure 4:
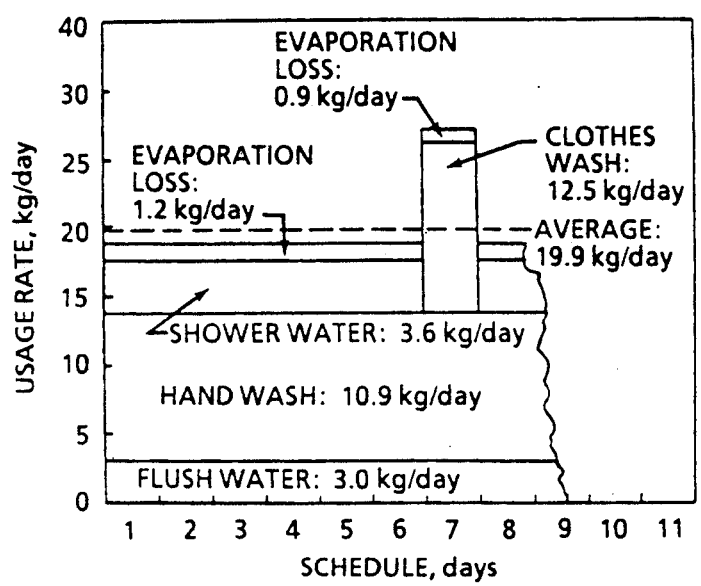
FIG. 4 shows hygiene water usage schedule.

The resulting schedule for hygiene water use is shown in FIG. 4. Crop water is fed to the plants. It has a relatively high solids content (0.2 percent), because it is a solution of plant nutrients (salts); however, it has to be microbiologically sterile.

There are five major sources of water for processing:
Humidity condensate (from cabin and greenhouse condensing heat exchangers)
Bosch product water Fuel cell product water
Wash water (from hand wash, shower, and clothes washer)
Urine water content (96 percent)

Some additional water is present in waste streams (trash moisture, feces, sludge, plants, inedible mass, and food scraps).

As shown in FIG. 1, the primary source for potable water is the fuel cell. A combination of an electrolyzer and a fuel cell is used as a potable water production system. The humidity condensate and the Bosch product water undergo multifiltration followed by electrolysis and become gaseous O2 and H2 which then are recombined into liquid water in the fuel cell. The quality of the water thus obtained is very high.

Some of the O2 and H2 produced by the electrolyzer are not fed into the fuel cell, but are used for cabin O2 makeup and H2 supply to the Bosch. Even though electrical energy is a byproduct of fuel cell water production, the combined electrolyzer fuel cell system is in fact a net energy consumer.

Another function of the electrolyzer/fuel cell system is to maintain the level of liquid water in the system. If the water level decreases in any of the potable, hygiene, or crop water loops, makeup water is produced by the fuel cell from stored O2 and H2; if the level increases, some water is electrolyzed and stored in gaseous form. This mode of operation allows a drastic reduction in the amount of stored liquid water, with consequent benefits of a lower demand on the microbiological control.

The hygiene water is recycled wash water that is recovered by a phase-change treatment via vapor compression distillation (VCD); the makeup water (to compensate the losses in sludge, flush, and evaporation) is provided by the fuel cell.

Urine is processed in a separate VCD subsystem and is the main source of crop water supply. The VCD is not a sterile subsystem and accumulation of sludge in the VCD itself can promote growth of microorganisms. Thus, the risk of transmitting pathogens to plants has to be dealt with as discussed in the paper M. Novara and H. S. Cullingford, "Bioisolation Analysis of Plants and Humans in a Piloted Mars Sprint." 18th Intersociety Conference on Environmental Systems, July 11-13, 1988.

Crop water is recirculated through the greenhouse, where the plants are hydroponically grown. A fixed concentration of different nutrient salts (nitrates, sulphates, and chlorides) is maintained by addition of these salts from storage into a crop water tank. The concentration of nutrients is checked periodically for adjustments as necessary; the water stored in the crop water tank acts as a buffer to reduce variations of concentrations in time.

A large share (83 percent) of the crop water taken by the plants is released into the greenhouse air by evapotranspiration. In effect, the urine-derived water undergoes a biological treatment through the plants. The nominal flow rates of water in the system are listed in Table 3.

TABLE 3

| Water Flow Rates (in grams/day) | |
| --- | --- |
| Potable water | 19 061 |
| Hygiene water | 19 868 |
| Crop water | 14 638 |
| Urine water | 8 910 |
| Flush water | 2 964 |
| Wash water | 15 777 |

TABLE 3-continued

| Water Flow Rates (in grams/day) | |
| --- | --- |
| Cabin humidity condensate | 14 259 |
| Greenhouse humidity condensate | 12 080 |
| Bosch product water | 5 015 |
| Fuel cell product water | 27 039 |
| To potable water | 19 061 |
| To hygiene water | 4 588 |
| To crop water | 3 390 |
| Electrolyzed water | 31 354 |
| Water loss in VCDs | 1 123 |
| Sludge | 570 |
| Purge | 553 |
| Water loss in cabin air leak | 16 |
| Other losses (waste materials) | 2 602 |

Food and Waste Processing

The main food supply to the crew is kept in frozen or dried form. The greenhouse provides a daily crop harvest of 1410 g of lettuce and 114 g of winged bean seeds (on a wet mass basis), which is 22 percent of the daily crew need. The lettuce is rich in fiber and mineral salts; it is, however, primarily water (94 percent). Winged bean seeds have only a 10 percent water content; they are rich in protein (40 percent on a dry basis) and in lipids (17 percent on a dry basis).

Several streams of waste products are listed in Table 4. In the present design, no provision is included for the recovery of any of those products. Urine is the only type of waste that is processed for water recovery.

TABLE 4

| Waste Products | | | |
| --- | --- | --- | --- |
|  | Daily Production (g/person/day) | Total Mission Production (kg) | Water content (percent) |
| Trash | 902 | 2273 | 9 |
| Feces | 161 | 406 | 75 |
| Food scraps | 93 | 234 | 63 |
| Wash water sludge | 60 | 152 | 50 |
| Urine sludge | 130 | 327 | 50 |
| Bosch carbon product | 264 | 665 | 0 |
| Plants inedible biomass | 199 | 500 | 87 |
| Total | 1809 | 4557 | — |

The primary reason for not selecting solid waste processing is that no particularly useful products could be obtained by such a procedure. Carbon dioxide and nitrogen are needed here in such small quantities that sufficient CO2 can be obtained from the crew metabolic processes and the nitrogen can be drawn from storage as part of a total of 44 kg of plant nutrients needed for the whole mission.

In contrast to the solid waste, the water content of the total waste, as shown in Table 4, is 29 percent on the average. Thus, a significant amount of water, approximately 1330 kg over the whole mission, could be available for reuse.

Storage Issues

If an LO2/LH2 propulsion system is selected, a common system of cryogenic tanks might also supply O2/H2 for life support. However, additional tanks are necessary for storage of gaseous O2 and H2 produced by the electrolyzer. Nitrogen is needed not only for cabin leakage makeup and air pressure control but also as sterile pressurant gas for all water tanks. Cryogenic storage is assumed for this system.

Water tankage is minimized, as mentioned above, by the use of the electrolyzer/fuel cell system. An amount equal to the nominal supply requirement of 3 days of liquid water is chosen as a design guideline to be stored for potable, hygiene, and crop water. Used water tankage meets the same guideline; however, used water tanks (humidity condensate, wash water, and urine) are normally kept empty as they are at the beginning of mission. They will fill up in 3 days if the associated processor (VCD, or electrolyzer/fuel cell) is temporarily out of commission and is undergoing maintenance.

Preliminary mass storage requirements are listed in Table 5. Amounts of O2, H2, and N2 are meant to be taken from cryogenic storage.

TABLE 5

List of Reservoirs

| Type | Content mass (kg) |
|---|---|
| Potable water | 57 |
| Hygiene water | 60 |
| Crop water | 44 |
| Wash water | 52 |
| Urine/flush water | 36 |
| Humidity condensate | 94 |
| Oxygen | 511 (73*) |
| Hydrogen | 11 |
| Nitrogen | 736 (250*) |
| Food | 2876(**) |
| Plant nutrients | 44 |

(*)Additional, at each cabin repressurization
(**)39 Percent water content

If the Space Station concept of no dumping is maintained for this mission, a waste of about 4.6 tons (see Table 4) needs to be stored aboard the spacecraft. The trash (mainly food packaging) and the product carbon can be placed in the storage space of the food being consumed. Other kinds of waste provide excellent habitats for microbiological colonies; these wastes need to be sterilized and/or contained in a bio-isolated environment.

Diversity and Redundancy Issues

Diversity in air and water processing is achieved by the use of both physical-chemical and biological means. Diversity in food supply is provided by fresh harvest supplementing the stored food.

The plants remove 9 percent of the CO2 produced by the crew while also producing 9 percent of the O2 required for the cabin atmosphere. Water recovered from urine and urinal flush is further processed by plants and converted into atmospheric humidity. This amount of water can be regarded either as 29 percent of the clean water required by the crew (potable plus hygiene) or 77 percent of the total water content of waste streams (as listed in Table 4, plus urine itself). Food produced by plants covers about 22 percent of the crew requirement on a wet mass basis. The primary effect of losing the plant growth capability would be on water processing. The demand for water would drop in this case because crop water would not be needed. However, to continue with hygiene water makeup, the urine-supplied VCD would be required to operate.

The fuel cell is a critical item of the water processing system. Although an inactive electrolyzer/fuel cell system can be bypassed, the water loss in waste would progressively reduce the level of available liquid water in the system. At the nominal rates of use/loss/recycle, the tanks of potable, hygiene, and crop water would be empty after 118 days of use. Redundancy in this function is required for system reliability.

SUBSYSTEM LEVEL DESIGN

Air Processing

The temperature and humidity control function is performed by a condensing heat exchanger. Representative hardware for the subsystem is the low-weight, long life heat exchanger (3LHX) developed by Hamilton Standard.

The 3 LHX operates at a flow rate of 458 kg/hr of cooling water at 277K on the cold side, and 620 kg/hr of air on the hot side. A typical performance point is 2 kW of sensible heat removed and 0.45 kg/hr of humidity condensate, with inlet-air conditions of 295K and 40 percent relative humidity, and an air bypass rate of 26 percent.

The 3LHX used for the greenhouse is identical to that of the cabin, but utilizes a water supply at 292K in order to obtain a higher dewpoint of the outlet air.

The CO2 removal from cabin air is the task of a molecular sieve subsystem. This is very similar in concept to the candidate design for the Space Station (C. D. Ray, K. Y. Ogle, R. W. Tipps, R. L. Carrasquillo, and P. Wieland, "The Space Station Air Revitalization Subsystem Design Concept." 17th Intersociety Conference on Environmental Systems, SAE Paper 871448, July 13–15, 1987), however, the size of the CO2 adsorption beds has been recalculated, in order to achieve a level of CO2 concentration in the cabin air lower than that specified for the Space Station. Beds have been sized using the partial pressure versus concentration characteristics of Zeolite 5A, as used in a 4-bed system (J. K. Jackson and R. L. Blakely, "Application of Adsorption Beds to Spacecraft Life Support Systems," in "Design Method for Absorption Beds." NASA TSP 69-10549, 1969. A 2-bed system would be a preferred solution, avoiding use of the additional desiccant beds; development of this design is in progress (C. D. Ray, K. Y. Ogle, R. W. Tipps, R. L. Carrasquillo, and P. Wieland, "The Space Station Air Revitalization Subsystem Design Concept." 17th Intersociety Conference on Environmental Systems, SAE Paper 871448, July 13–15, 1987). Each zeolite bed is 21 kg in mass. With a process air flow rate of 174 kg/hr through the adsorbing bed (water cooled) and 600 W heater power on the desorbing bed, the CO2 concentration can be maintained below 0.17 percent; the average rate of CO2 removal is 0.26 kg/hr.

A Bosch reactor subsystem is used for CO2 reduction in preference to a Sabatier subsystem mainly to avoid the loss of hydrogen in the product CH4. The Bosch subsystem is similar to the candidate Space Station subsystem. Heater power in the order of 290 W is spent to maintain the reactor at the operational temperature (950K); the process gas is recycled through the reactor by a compressor, requiring about 70 W electrical power supply. The average rate of condensate water production is 0.21 kg/hr.

Water Processing

The static-feed water electrolysis subsystem is the electrolyzer. The static-feed design has been chosen mainly because of the lower electrical power demand of this subsystem.

The electrolyzer operates at a feed water flow rate of 1.3 kg/hr on a continuous basis, in order to avoid efficiency drops during thermal transients at startup. The electrolysis cell package is kept at 340K by active thermal control (the internal loop of process water is also used for cooling). Electrical energy is supplied at the rate of 17 MJ per kg of water electrolyzed. The subsystem fluid pressure of 1240 kPa is the highest water pressure in the life support system.

The Shuttle Orbiter fuel cell is chosen as the fuel cell for this subsystem ("Orbiter Fuel Cell Powerplant Review and Training Course." International Fuel Cells Division, United Technologies Corp, May 1986). The fuel cell is operated continuously as well at a flow rate of 1.1 kg/hr of product water. The cell stack is maintained at high temperature, between 356 and 375K, according to the load. Oxygen and hydrogen are supplied from either the electrolyzer product tanks or the cryogenic storage and are regulated at pressures of 448 and 413 kPa, respectively.

The net electrical energy available to external users is about 9 MJ per kg of fuel cell product water. Together with the above demand of 17 MJ/kg for electrolyzed water, this energy value shows that the use of an electrolyzer/fuel cell system for water processing is consuming electrical energy at the rate of 8 MJ per kg of processed water. For the nominal case of Table 3, about 2.5 kW would be necessary.

The VCD subsystems are used for wash water and urine/flush water processing. A Lockheed VCD preprototype is the basis for subsystem performance (see K. L. Johnson, "Development of a Preprototype Vapor Compression Distillation Water Recovery Subsystem." Lockheed Missiles & Space Co. Inc., LMSC/D626041, Nov. 1978). Feedstock from the used water tank is taken into an internal recycle loop; part of the water is continuously evaporated in a boiler, and then condensed. The water vapor is compressed and then condensed at a temperature higher than the boiler evaporation temperature; transfer of the latent heat from the condenser into the boiler is thus possible. The resulting power demand is relatively low: about 0.5 MJ per kg of product water, achieved with a coefficient of performance of 5.3.

Greenhouse

The greenhouse is characterized below by a number of design features and requirements.

Use of hydroponic techniques for plant growth

A confined-liquid system is needed for microgravity operation; one such design is based on crop water delivery to plant roots through a tubular microporous membrane, acting as a capillary interface for the exchange of water and salts in solution. (See T. W. Dreschel, R. P. Prince, C. R. Hinkle, and W. M. Knott, "Porous Membrane Utilization in Plant Nutrient Delivery." ASAE Paper 87-0425, June 28-July 1, 1987).

Artificial lighting

High pressure sodium lamps are used, with an efficiency of about 27 percent, in order to obtain a level of illumination of 50 W/m2 at the crop canopy. Total electrical power for lamps is 1452 W. Constant lighting is assumed, with no day/night cycles. Water-cooled lamps will probably be the design basis. (See H. V. Koontz, R. P. Prince, and R. F. Koontz, "Comparison of Fluorescent and High-Pressure Sodium Lamps on Growth of Leaf Lettuce." HortScience 22(3), 1987, pp. 424–425.)

Total growth area

A total area of 8 m2 is used to estimate the lamp power; plants would probably not be grown on a flat surface but would somehow adapt to the internal geometry of the spacecraft modules. The growth area is split equally between lettuce and winged beans.

Enclosed atmosphere

The greenhouse air would not be in direct connection with the cabin air, except through the flow rate exchanged for air revitalization purposes (which is drawn through contamination control devices). Air requirements for the greenhouse are listed in Table 1; these are obtained from several sources (for example: C. A. Mitchell, S. L. Knight, and T. L. Ford, "Optimization of Controlled Environments for Hydroponic Production of Leaf Lettuce for Human Life Support in CELSS." CELSS '85 Workshop, July 16-19, 1985, and R. P. Prince, W. M. Knott, S. E. Hilding, and T. L. Mack, "A 'Breadboard' Biomass Production Chamber for CELSS." 33rd AAS Annual Meeting "Aerospace: Century XXI", Oct. 26-29, 1986.) Free view of the plants will be offered to the crew through a transparent structure. A "glove box" approach will be used for handling the plants (seeding or transplanting, sampling, or harvesting) from the cabin environment. Several small airlocks (2 dm3) can be used for the collection of the harvested biomass.

Ventilation

Fans will recirculate the greenhouse air at the speed indicated in Table 1. This is primarily a thermal control requirement for plants to remove the heat generated by the lamps and to enhance the water evaporation from the plants.

As may be seen, therefore, the present invention has numerous advantages and offers important improvements over the prior art. For example, the use of bioregenerative techniques to reduce the amount of water, hydrogen, oxygen and food necessary for life support; the synergistic mode of operations between the life support system and other spacecraft systems such as propulsion and power systems; providing for the crew high quality air and water; as well as providing enhanced morale and other psychological advantages of having fresh food during extended periods of isolation. Other advantages are also apparent from the foregoing specification.

What is claimed is:

1. A spacecraft life support system comprising, as integral parts thereof, a crew cabin capable of maintaining an environment conducive to human crew life and a greenhouse capable of maintaining plant life and, whereby, said crew cabin and said greenhouse are interrelated with each other and with other spacecraft systems such that portions of the consumables; food, carbon dioxide, water, hydrogen and oxygen; are regenerated and exchanged between said crew cabin, said greenhouse and said other spacecraft systems including returning portions of said regenerated consumables from the crew cabin and greenhouse to the other spacecraft systems so as to minimize over a period of time the amount of said consumables required wherein the cabin air contamination control comprises a microbiological control treatment, a HEPA particulate control, and a trace contaminant oxidizer.

2. The life support system of claim 1 wherein the microbiological control treatment comprises ultraviolet irradiation.

3. The life support system of claim 1 wherein the trace contaminant oxidizer comprises a catalytic burner.

4. The life support system of claim 1 having both an electrolyzer system for electrolyzing water into hydrogen and oxygen, and a fuel cell system for combining hydrogen and oxygen into water and electricity.

5. The method of bio-regenerative life support for processing air, water, and food for human use in a crew cabin and for processing air, water, and nutrients for a plant greenhouse comprising the following steps;
  (a) controlling the crew air from the crew cabin by separating the humidity condensate from the crew air in a first contaminant and humidity control unit,
  (b) removing carbon dioxide from a first portion of the crew air,
  (c) reducing the carbon dioxide to carbon,
  (d) returning the first portion of the crew air to the crew cabin,
  (e) sending a second portion of the crew air to the greenhouse,
  (f) cleaning the humidity condensate from step (a) in a first multifiltration unit,
  (g) decomposing the humidity condensate from step (f) into oxygen and hydrogen,
  (h) returning a first portion of the oxygen to the crew cabin,
  (i) sending a second portion of the oxygen to a fuel cell,
  (j) producing product water from a first portion of the hydrogen and the carbon dioxide reduced in step (c),
  (k) returning the product water to the first multifiltration unit,
  (l) sending a second portion of the hydrogen to the fuel cell,
  (m) producing in the fuel cell potable water,
  (n) returning potable water to the crew cabin,
  (o) recovering water from wash water from the crew cabin in a first water recovery system,
  (p) cleaning the recovered wash water in a second multifiltration unit to produce hygiene water,
  (q) returning the hygiene water to the crew cabin,
  (r) recovering water from urine from the crew cabin in a second water recovery system,
  (s) cleaning the water recovered in step (r) in a third mulitifiltration subsystem,
  (t) adding nutrients to water from step (s) to produce crop water for the greenhouse,
  (u) separating the humidity condensate from the oxygen rich greenhouse plant air in a second contaminant and humidity control unit,
  (v) sending the humidity condensate from step (u) to the first multifiltration subsystem,
  (w) sending the oxygen rich air from step (u) to the crew cabin,
  (x) sending spent nutrient solution from the greenhouse to the third multifiltration subsystem,
  (y) cleaning the water recovered in step (x) in the third multifiltration subsystem,
  (z) adding nutrients to water from step (y) to produce crop water for the greenhouse, and
  (aa) using fresh plants from the greenhouse as food in the crew cabin.

6. The process of claim 5 wherein the multifiltration subsystems use vapor compression distillation processes.

7. The process of claim 5 wherein decomposing the humidity condensate is done by static-feed water electrolysis.

8. The process of claim 5 wherein the carbon is reduced using Bosch reactor processing.

9. The process of claim 5 wherein the carbon dioxide is removed using molecular sieve processing.

10. The process of claim 5 wherein the air contamination control in the crew cabin is achieved by irradiating with ultra violet light, HEPA filtering, and trace contaminant oxidizing.

11. The process of claim 5 wherein the air contaminant control in the greenhouse is achieved by irradiating with ultra violet light, HEPA filtering, and trace contaminant oxidizing.

12. The method of life support comprising the steps;
  (a) supplying air for a crew cabin in part with oxygen rich exhaust from a greenhouse,
  (b) supplying air for the greenhouse by carbon dioxide rich air from the crew cabin,
  (c) recovering hygiene water for the crew cabin from wash water from the crew cabin,
  (d) recovering water from urine in the crew cabin for use as crop water for the greenhouse,
  (e) condensing humidity from the crew cabin air to produce potable water, and
  (f) condensing humidity from the greenhouse to produce potable water,
  (g) electrolyzing humidity condensate into hydrogen and oxygen,
  (h) combining the hydrogen and oxygen to produce potable water, and
  (i) furnishing the potable water to the crew cabin.

* * * * *